United States Patent
De Monet et al.

(10) Patent No.: US 9,227,436 B2
(45) Date of Patent: Jan. 5, 2016

(54) CUTTING A FIRST MEDIA PORTION WHILE PRINTING ON A SUBSEQUENT MEDIA PORTION

(75) Inventors: Raimon Castells De Monet, Barcelona (ES); Jesús Garcia Maza, Terassa Barcelona (ES); Francisco Guerrero Carvajal, Sant Cugat del Valles Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/368,274

(22) PCT Filed: Dec. 29, 2011

(86) PCT No.: PCT/US2011/067975
§ 371 (c)(1),
(2), (4) Date: Jun. 23, 2014

(87) PCT Pub. No.: WO2013/101126
PCT Pub. Date: Jul. 4, 2013

(65) Prior Publication Data
US 2014/0374980 A1    Dec. 25, 2014

(51) Int. Cl.
*B41J 11/70* (2006.01)
*B41J 29/38* (2006.01)
*B41J 2/01* (2006.01)
*G06K 15/10* (2006.01)
*B41J 11/66* (2006.01)
*B41J 11/42* (2006.01)

(52) U.S. Cl.
CPC ............. *B41J 11/663* (2013.01); *B41J 11/425* (2013.01); *B41J 11/706* (2013.01); *G06K 15/105* (2013.01); *G06K 15/107* (2013.01); *G06K 2215/111* (2013.01); *Y10T 83/283* (2015.04)

(58) Field of Classification Search
CPC .............................. B41J 11/663; B41J 11/425
See application file for complete search history.

(56) References Cited

U.S. PATENT DOCUMENTS

| 5,911,530 A | 6/1999 | Hinojosa et al. |
| 6,454,475 B2 | 9/2002 | Giles et al. |

(Continued)

FOREIGN PATENT DOCUMENTS

| JP | 08-156355 A | 6/1996 | |
| JP | 2002001693 A * | 1/2002 | ............ B26D 7/10 |

(Continued)

OTHER PUBLICATIONS

International Searching Authority, International Search Report and Written Opinion, PCT/US2011/067975, 9 pages, Sep. 24, 2012.

*Primary Examiner* — Daniel J Colilla

(57) ABSTRACT

A primer, a method, and a non-transitory computer-readable storage medium are described. An example non-transitory computer-readable storage medium stores instructions that, when executed by a processor, cause the processor to instruct a printer to advance a media by a first distance. The instructions, when executed, also cause the processor to instruct the printer to advance the media by a second distance different than the first distance to align the media with a cutter assembly. The instructions, when executed, also cause the processor to adapt an interleave mask based on the second distance. The instructions, when executed, also cause the processor to instruct the cutter assembly to separate a first portion of the media from a second portion of the media while the printer is printing on the media.

11 Claims, 6 Drawing Sheets

(56) References Cited

U.S. PATENT DOCUMENTS

| | | |
|---|---|---|
| 7,059,793 B2 | 6/2006 | Mori et al. |
| 7,588,382 B2 | 9/2009 | Sato et al. |
| 8,864,394 B2 * | 10/2014 | Cofler .................. 400/621.1 |
| 2002/0172539 A1 * | 11/2002 | Iwamura ................. 400/582 |
| 2008/0181711 A1 | 7/2008 | Monclus et al. |
| 2010/0080643 A1 | 4/2010 | Toshito et al. |
| 2011/0103869 A1 | 5/2011 | Shirotori |
| 2012/0299991 A1 * | 11/2012 | Wakita ..................... 347/16 |

FOREIGN PATENT DOCUMENTS

| | | | | |
|---|---|---|---|---|
| JP | 2003112454 A | * | 4/2003 | ............ B41J 11/70 |
| JP | 2003145483 A | * | 5/2003 | ............ B26D 1/24 |
| JP | 2007001317 A | | 1/2007 | |
| JP | 2010023387 A | | 2/2010 | |
| JP | 2010162902 A | * | 7/2010 | ............ B41J 11/70 |
| JP | 2011131492 A | * | 7/2011 | ............ B41J 11/70 |

* cited by examiner

CUTTING A FIRST MEDIA PORTION WHILE PRINTING ON A SUBSEQUENT MEDIA PORTION

BACKGROUND

When printing on a media roll, at some point the printed media portion needs to be separated from the rest of the roll. Media rolls or other media types may be cut by a cutter device that is separate from the printer. Sometimes a cutter device is integrated with or attached to a printer already. Sometimes, a media roll needs to be positioned for cutting after printing a first media portion, and then repositioned for printing a second media portion. Cutting media, including positioning and repositioning, may provide for a substantial delay of the printing process.

BRIEF DESCRIPTION OF THE DRAWINGS

For the purpose of illustration, certain examples of the present invention will now be described with reference to the accompanying drawings, in which.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that also examples or elements that are not literally disclosed may be derived from the description and drawings by a person skilled in the art.

Figure 1:
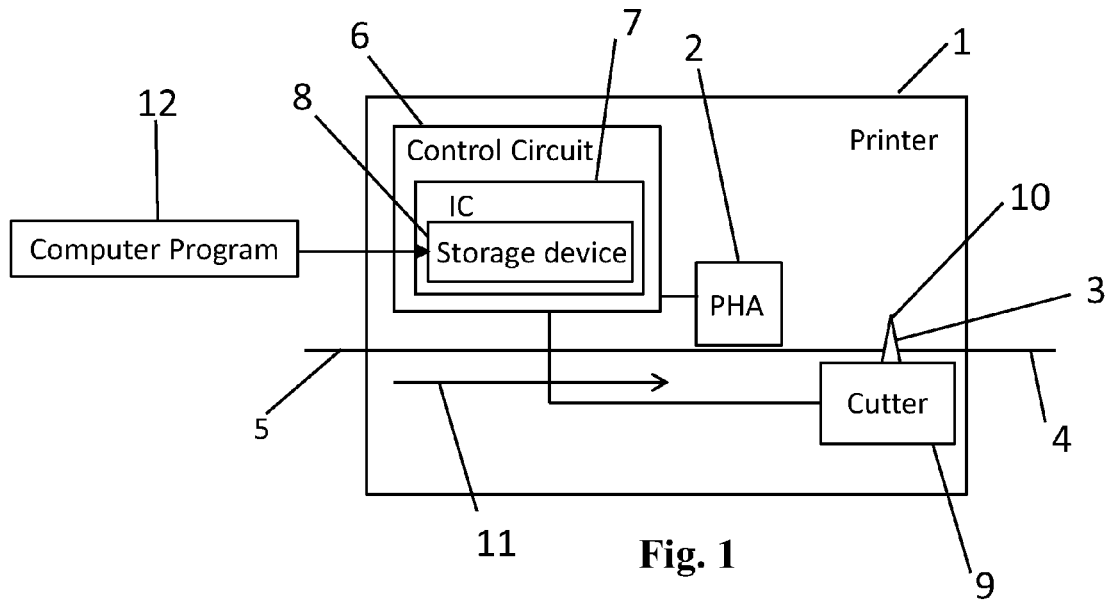
FIG. 1 shows a diagram of an example of a printer including an example of a computer program.

FIG. 1 shows an example of a printer 1. The printer 1 includes a printhead assembly 2 and a cutter assembly 3 arranged downstream of the printhead assembly 2. In the shown example, the cutter assembly 3 includes a carriage 9 and a cut edge 10. The cutter assembly 3 is arranged to cut in a direction perpendicular to a media advance direction 11.

In the shown example state, media is positioned in the printer 1. In the shown example state a first media portion 4 has already been printed and a second, subsequent media portion 5 is being printed. The first media portion 4 is located downstream of the second media portion 5. The second media portion 5 may be part of a larger media roll. The rest of the media roll may be located upstream.

In one aspect of this disclosure, the printer 1 includes a control circuit 6 that is configured to instruct the cutter assembly 3 to separate a printed first media portion 4 from the subsequent media portion 5 during printing of the subsequent media portion 5. Such separation may be achieved by cutting. This process may allow for the printer 1 to cut media without interrupting the print process or relocating the media after separation.

In an example, the control circuit 6 an integrated circuit 7, for example an analogue and a digital integrated circuit. In further examples, the control circuit 6 includes a Raster Image Processor (RIP) or a formatter. The control circuit 6 may be configured to instruct different printer parts such as drive parts and the print head assembly 2. The control circuit 6 includes a storage device 8, for example a non-volatile storage device 8 comprising a hard disk drive or a flash drive or any other suitable storage device 8. The storage device 8 may store a computer program 12. The computer program 12 may include a code configured to instruct the control circuit 6 to instruct a cutter assembly 3 to separate the first printed media portion 4 from the subsequent media portion 5 during printing of the subsequent media portion 5. In other examples, at least a portion of the computer program 12 may be stored on a distant location, such as a wirelessly connected storage device or a server. The printer 1 may be connected to the internet through a wired or wireless connection and may receive instructions for printing through the internet.

In a further example, the printer 1 may be a large format printer for printing on large format media. The media 4, 5 may be provided as a media roll wherein the printed media portions 4 are separated from the roll by cutting. The printer 1 may be an inkjet printer. In an example, the cutting movement is executed between two subsequent media advance movements. In an example, the print head assembly 2 is a scanning print head assembly 2, and a cutting movement of the cutting device 3 may run parallel and either synchronous or asynchronous to a print head assembly scanning movement. The control circuit 6 may be configured to instruct the cutter assembly 3 to cut off the first media portion 4 between subsequent media advance movements for printing the subsequent media portion 5.

Figure 2:
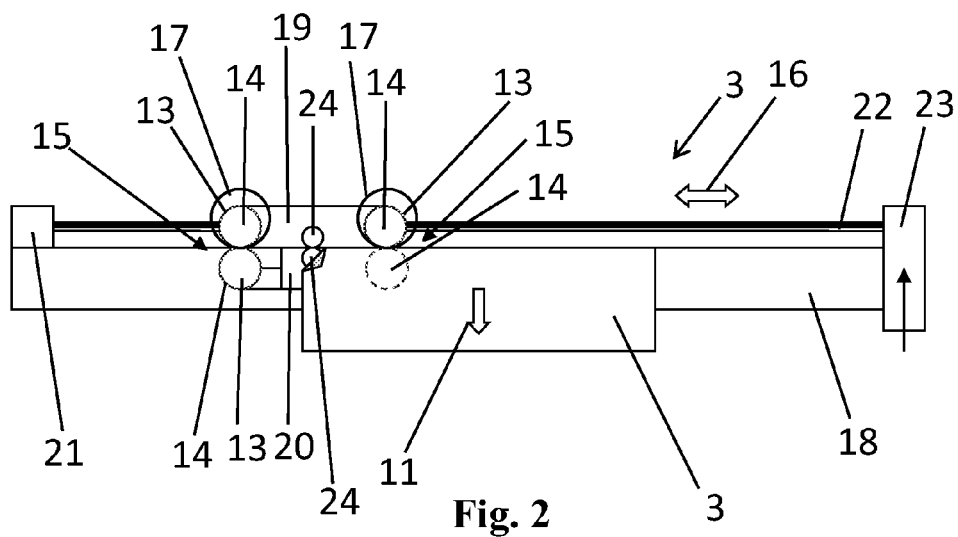
FIG. 2 shows a diagram of an example of a cutter accessory including a cutter assembly.
Figure 3:
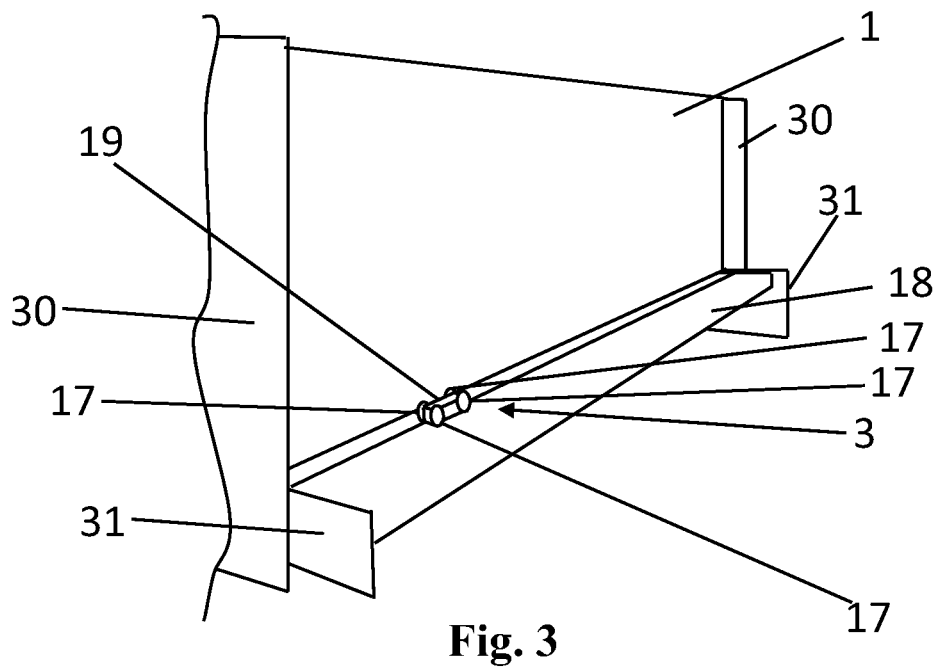
FIG. 3 shows an example of a part of a printer in perspective view.

FIG. 2 shows an example of a cutter assembly 3. The shown example cutter assembly 3 may be integrated with the printer 1 and arranged downstream of the printhead assembly 2 as illustrated in FIGS. 1 and 3. In a further example, the cutter assembly 3 may be provided as an accessory that is arranged to be mounted to the printer 1, for example near the media outlet part. In an example, a computer program 12 is provided together with the cutter assembly accessory for driving the cutter assembly 3 may be provided. The computer program 12 may be provided as a software upgrade or driver or the like to be installed in the printer storage device 8 for facilitating operation of the cutter accessory.

The example cutter assembly 3 of FIG. 2 includes cut edges 14. In the shown example, the cut edges 14 are part of cutter wheels 13. The example cutter assembly 3 also includes driving wheels 17 that can be used to move the cut edges 13 over the media and retain the media 4, 5 during movement. The shown example cutter assembly 3 is arranged to cut the media 4, 5 in two opposite directions 15, perpendicular to the media advance direction 11. The example cutter assembly 3 includes two cutter wheel pairs 15. Each cutter wheel pair 15 includes one cutter wheel 13 on each side of the media 4, 5, in use providing for a scissor-like cutting effect. Each pair 15 may be arranged to cut through the print media in one of the two directions 16. The cutter wheels 13 are arranged near the respective driving wheels 17 to cut the media 4, 5 where it is retained by the respective driving wheels 17 against a platen or guide structure 18. The driving wheels 17 may comprise an elastomeric or polymer surface material to on the one hand provide sufficient friction to avoid displacement of the media with respect to the cutter wheels 13 and on the other hand avoid damage to the printed image or media 4, 5. The example cutter assembly 3 includes a carriage 19 to which the cutter wheels 13 and the driving wheels 17 are mounted. In the example, a guide structure 18 is provided for guiding the carriage 19, and that supports the media and the driving wheels 17. For example, the guide structure 18 is shaped as a hollow beam. In an example, the driving wheels 17 drive over the top surface while a lower part of the carriage 20 and the lower cutter wheels 14 may be arranged within the hollow beam.

A drive 21 of the cutter assembly 3 is provided. In one example, the drive 21 includes a servo motor. For example, the control circuit 6 is configured to instruct the drive 21 to drive the cutter assembly 3 while scanning the print head assembly 2 (FIG. 1). In further examples, the drive 21 includes an electro motor and a drive transmission 22. In certain examples, the drive 21 of the cutter assembly 3 may be mechanically or electrically coupled to a drive of the scanning printhead assembly 2, for example to cut during a printhead scanning action.

For example, the drive transmission 22 includes a belt that is connected to the carriage 19, 20, pulleys 23 and an encoder. The control circuit 6 may be configured to communicate with the encoder to determine a location of the carriage 19, 20. The control circuit 6 may be configured to determine a cutting direction based on the carriage location 19, 20 with respect to the media. For example, the shown cutter assembly 3 is arranged to separate a first media portion 4 from a subsequent media portion 5 in a first cutting direction 16, and later separate the subsequent media portion 5 from a second subsequent media portion (not shown) in an opposite cutting direction 16, etc. Each cutting movement of the cutter assembly 3 may be executed during a corresponding scanning movement of the printhead assembly 2 for printing of the respective subsequent media portion 5. In this way, a separation of the first media portion 4 may be realized without interrupting a print process of the subsequent media portion 5.

The cutter assembly 3 includes a cauterization device 24 arranged to cauterize the cut media edges of the respective media portions 4, 5 while cutting. In this disclosure cauterization may be understood as finishing the respective media edges, for example by heating, freezing, chemical agent, etc. For example, a cauterization action may melt, burn, dissolve or otherwise remove protruding fibers of the media edge after cutting. The cauterization device 24 may be arranged to heat, freeze, provide current to, or provide a cauterization agent on the respective media portion edges to achieve a proper finishing of the media edges.

In the shown example, the cauterization device 24 is provided between the cutter wheels 14 so as to cauterize after cutting in each of the two directions 16. The cauterization device 24 may include one or two cauterization wheels 25 or for example a finger shaped cauterization device of which the end can be heated. In one example, the cutter assembly 3 cuts and cauterizes the respective media edges during printing of the subsequent media portion 5, for example between two subsequent media advance movements for printing the subsequent media portion 5, for example during a printhead assembly 2 scanning action. The integrated cauterization device 24 allows for an integrated separation and edge finishing of the printed media portion 4 during printing of the subsequent media portion 5, that is, without interrupting a print process of the same printer. The cauterization device 24 may be arranged to be switched on and off to allow an operator to choose whether or not to cauterize the media portion edges during cutting.

In other examples, instead of driving wheels 17 other guide and driving parts may be provided, for example a slide or the like. For example, the carriage 19, 20 may be directly supported by a belt or the like. Instead of or in addition to cutter wheels 13 the cutter assembly 3 may include other cutting devices for cutting such as cutting blades, for example in the form of a knife or scissors, in pairs or single devices, arranged to cut in one or two directions.

FIG. 3 shows an example of a back side of a large format printer 1 that has a maximum media print width of more than 3 meters. In other examples of printers with cutter examples, the maximum media width may be more than 4, 5 or 6 meters. The cutter assembly 3 is provided downstream of a print zone. The cutter assembly 3 is mounted to the printer frame 30, for example through a cutter assembly frame 31. A carriage 19 having two pairs of driving wheels 17 is provided on top of the guide structure 18. Although the cutter assembly 3 may include cutter wheels 14, a cauterization device 24 and an inner carriage 20 these cannot be distinguished in this view. In an example, the cutter wheels are provided between each driving wheel pair. For example, the cauterization device 24 may be provided in the middle between the driving wheel and cutter wheel pairs 15, and the inner carriage 20 may be provided under the top carriage 19, in correspondence with FIG. 2. The transmission for driving the carriage 19, 20 may be provided inside the guide structure 18.

Figure 4:
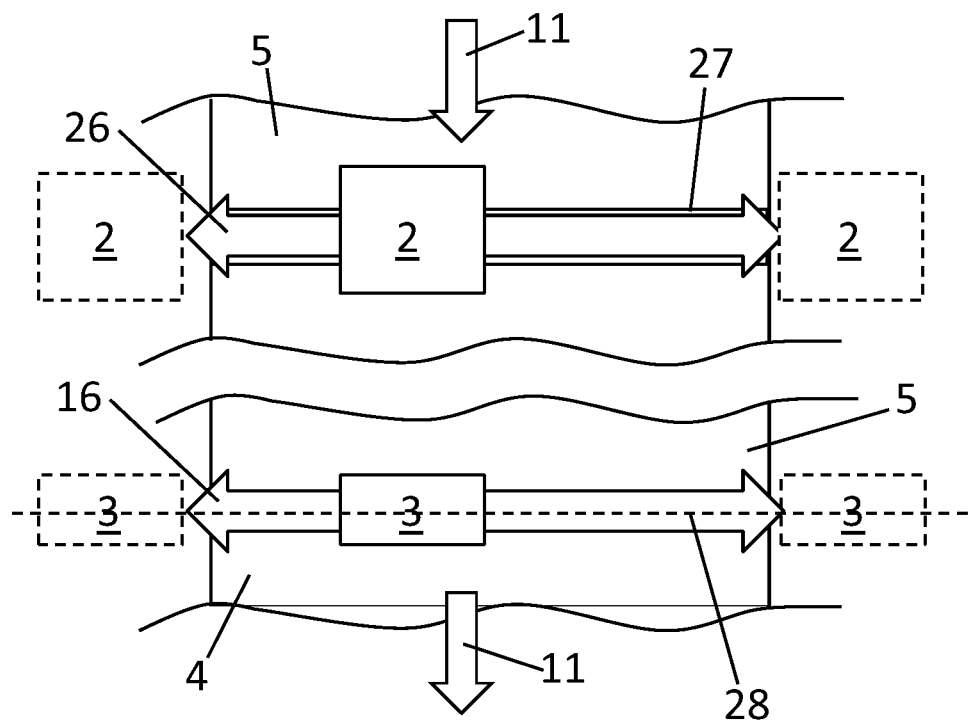
FIG. 4 shows a diagram of a top view of an example of a printer.

FIG. 4 shows a diagram of a top view of media 4, 5 that advances under the printhead assembly 2 in an advance direction 11. The printhead assembly 2 scans over the media 4, 5 in opposite scanning directions 26 that are perpendicular to the media advance direction 11 and parallel to the cutting directions 16, printing a swath 27 on the media portion 5 after each media advance movement. The cutter assembly 3 cuts along a cut line 28. In an example, the control circuit 6 is configured to instruct (i) the printhead assembly 2 to perform a one- or two-way scanning action between two media advance movements for printing the subsequent media portion 5 and (ii) instruct the cutter assembly 3 to cut between these two media advance movements, for separating the printed media portion 4 during the scanning action and without interrupting the print process of the media portion 5 currently undergoing printing.

Figure 5:
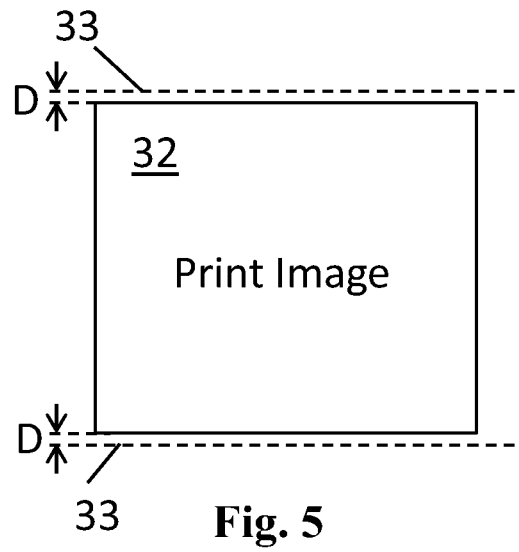
FIG. 5 shows an example of a representation of virtual print job information.

FIG. 5 shows an example of print job information for printing a print image 32 on media 4 and cutting the media portion 4 that contains the image 32 and the cut line location 33. FIG. 5 illustrates the print job information, which may be a digital code for entry into the storage device 8. The cut lines locations 33 correspond to the later actual cut lines 28 and the print image 32 corresponds to a later actually printed image 34A on the printed media portion 4 (e.g. see FIG. 6). The print job information may include a desired distance D between the respective cut line locations from a point or edge of the printed image. For example, the control circuit 6 is configured to receive said print job information and instruct the cutter assembly 3 to separate the first media portion 4 at said cut line location 33, when printing a subsequent media portion 5. The cut line location 33 may be included in the original print job information or may be received by the printer 1 at any given point in time, for example through a user interface.

Figure 6:
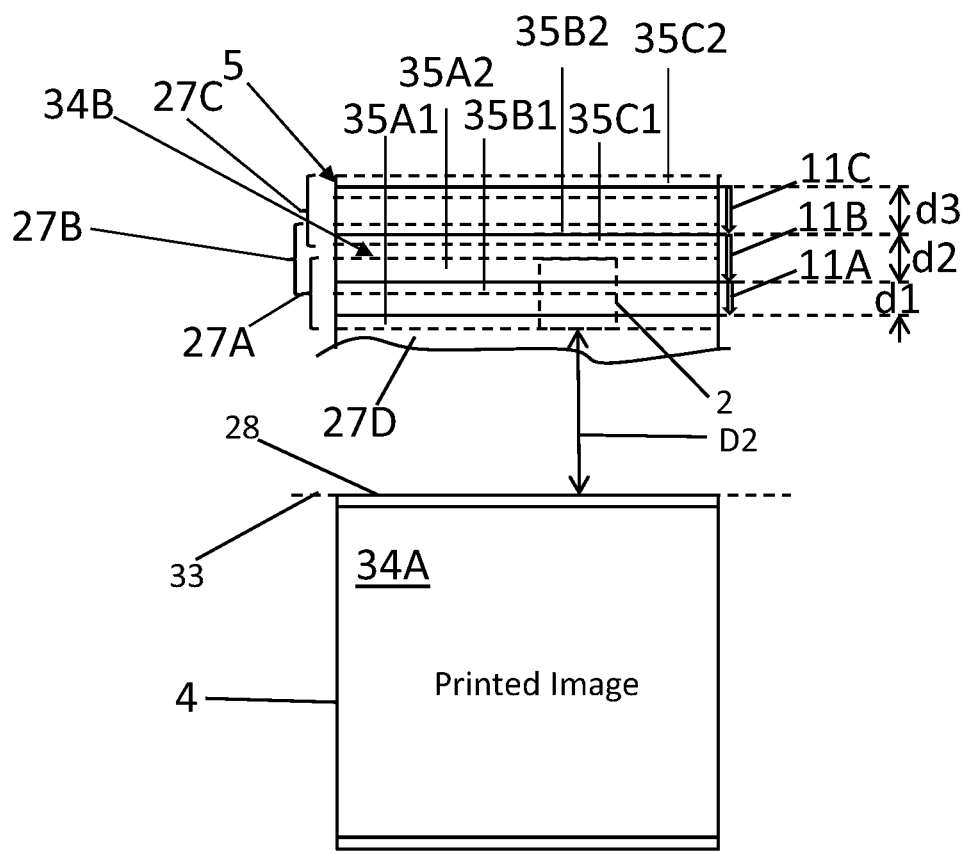
FIG. 6 shows a diagram of an example with a first media portion and a portion of a second media portion.

FIG. 6 shows an example of subsequent, partially overlapping swaths 27A-C of a partially printed image 34B on a media portion 5 printed subsequent to the first media portion 4. The first media portion 4 includes a first printed image 34A. The swaths 27A-C are printed after each corresponding media advance movement 11A-11C, respectively. After each media advance movement 11A-11C a unidirectional scanning movements or one or more bi-directional scanning movements may be executed by the printhead assembly 2 for printing the swath. In one example, a media advance movement 11A-11C is executed after each scanning movement over a media width. In other examples, a media is advanced after multiple scanning movements over the media width.

In an example, each swath 27A-C has an equal total swath width. In an example, a region of each swath 27A-C overlaps a previous and/or subsequent swath 27A-C. In an example, more than two swaths may overlap to achieve a desired coverage. In an example, the patterns in the overlapping swath regions are determined by interleave masks 35A1, 35B1, 35B2, 35C1, 35C2, 35D1. These interleave masks 35A1, 35B1, 35B2, 35C1, 35C2, 35D1 are arranged so that the subsequent overlapping swaths 27A-C form a printed image 34B without banding.

An example swath 27B includes a first interleave mask 35B1 overlapping a previously printed swath 27A and a second interleave mask 35B2 overlapping a subsequently printed swath 27C. The previously printed swath 27A may include a third interleave masks 35A1 overlapping an earlier printed swath 27D and a fourth interleave mask 35A2 overlapping the subsequently printed swath 27B. In one example, the control circuit 6 may include a RIP (Raster Image Processor) or formatter configured to calculate the swath's patterns, including the patterns of the interleave masks 35A1, 35B1, 35B2, 35C1, 35C2, 35D1, and instruct the printhead assembly 2 accordingly.

In an example, the control circuit 6 is configured to adapt at least one media advance movement 11A during the printing of the subsequent media portion 5, for aligning a predetermined cut line location 33 with respect to the cutter assembly 3. As the preferred location 33 of the cut line 28 may be included in the original print job information, or has been entered manually through a user interface, and the distance D2 between the printhead assembly 2 and the cutter assembly 3 is fixed and predetermined, at least one media advance movement distance d1 may be adapted so that a cut line location 33 of the media 4, 5 is aligned to the cutter assembly 3, and the first printed media 4 is separated along said cut line 28 at the preferred location 33 as provided by the print job or other input. As can be seen the media advance movement 11A for printing the first swath 27A is shorter than the standard advance movements d2, d3 so as to make the cut line 28 correspond to the desired cut line location 33.

In a further example, the control circuit 6 is configured to adjust another characteristic of at least one swath 27A, 27B for printing the subsequent media portion 5 when aligning the media 4, 5 with respect to the cutter assembly 3. For example, an interleave mask 35A1 or 35B1 may be adjusted to ensure proper matching of subsequent swaths 27A, 27B. For example, the interleave mask 35A1 or 35B1 may be rearranged. For example, the interleave mask 35A2 may be repositioned or widened for proper matching of subsequent swaths 27A-D. For example a respective interleave mask pattern 35A2 may be rearranged for proper matching with a respective swath 27A-C. Multiple interleave masks 35A1, 35B1, 35B2, 35C1, 35C2, 35D1 may need to be adapted to align the media to the cutter assembly 3 so that the eventual cut line 28 at least approximately corresponds to the predetermined cut line location 33.

Adjusting the media advance movement distance d1 and the interleave mask 35A2 may allow for separating the media during printing of a along a predetermined or input cut line location 33. In different examples, the cut line location 33 may be (i) a standard distance from a printed image's border, (ii) entered manually or (iii) retrieved from the print job information. In another example, the first media portion 4 is separated without adjusting a media advance movement distance d1-d3, for example while performing a standard printhead assembly scanning action after a standard media advance action and without changing an interleave mask characteristic. Herein, the cut line location is adapted to the scan and media advance characteristics of the subsequent print.

In a further example, the control circuit 6 is configured to receive an immediate cut instruction, for example through a user interface, and, upon receiving such instruction, separate the first media portion 4 at a current, next or other subsequent printhead assembly scanning action. For example, a media advance movement distance or interleave mask characteristic need not be adjusted.

In another example, the printhead assembly 2 includes a page wide array printheads instead of a scanning printhead assembly and media advance movements may be adapted or interrupted for allowing separation of the first media portion 4, for example on a predetermined cut line location 33, while the subsequent media portion 5 is being printed.

Figure 7:
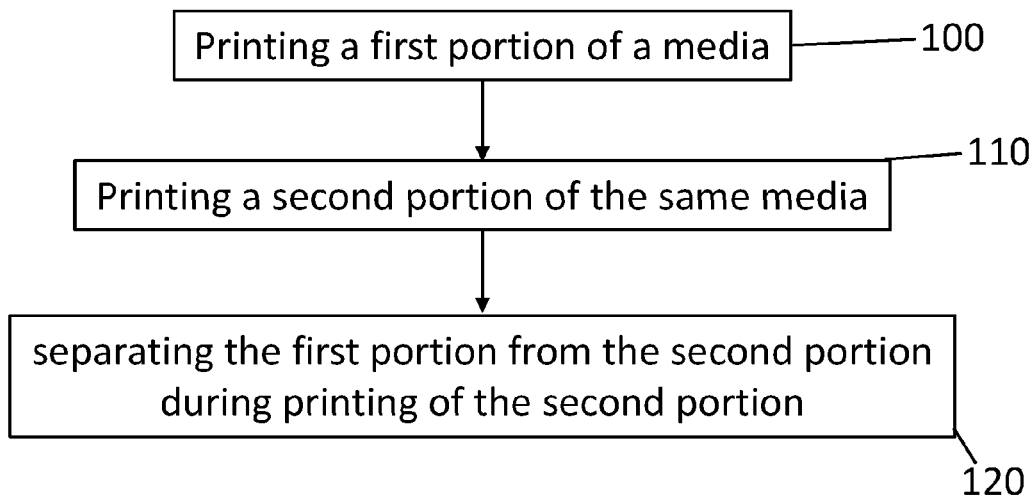
FIG. 7 shows a flow chart of an example of a method of printing.

FIG. 7 shows a flow chart of an example of a method of printing. The example method includes printing a first portion 4 of a media (block 100), for example forming a first printed image 34A. The example method includes printing a second portion 5 of the same media (block 110), for example forming the second printed image 34B. The example method includes separating the first portion 4 from the second portion 5 during printing of the second portion 5 (block 120).

Figure 8:
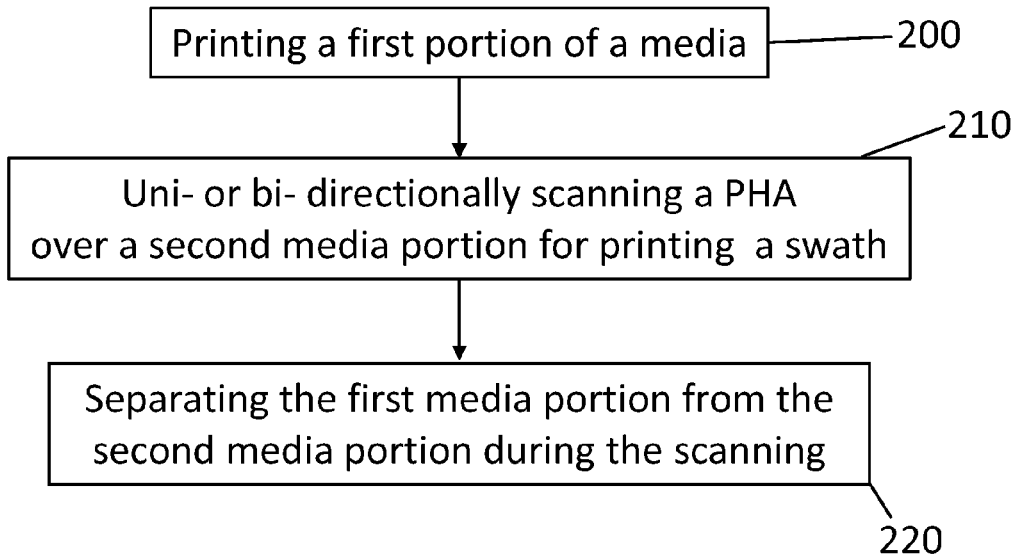
FIG. 8 shows a flow chart of another example of a method of printing.

FIG. 8 shows a flow chart of a further example of a method of printing. The example method includes printing a first media portion 4 (block 200). The example method includes executing a unidirectional scanning movement or one or more two-way scanning movements of the printhead assembly 2 for printing a swath 27A, 27E over the second portion 5 (block 210). The example method includes separating the first portion 4 from the second portion 5 during the scanning movement (block 220), with the cutter assembly 3. For example, the cutter assembly 3 moves while the scanning movements are being executed, between two subsequent media advance movements 11A-11D, approximately parallel to the printhead assembly 2.

Figure 9:
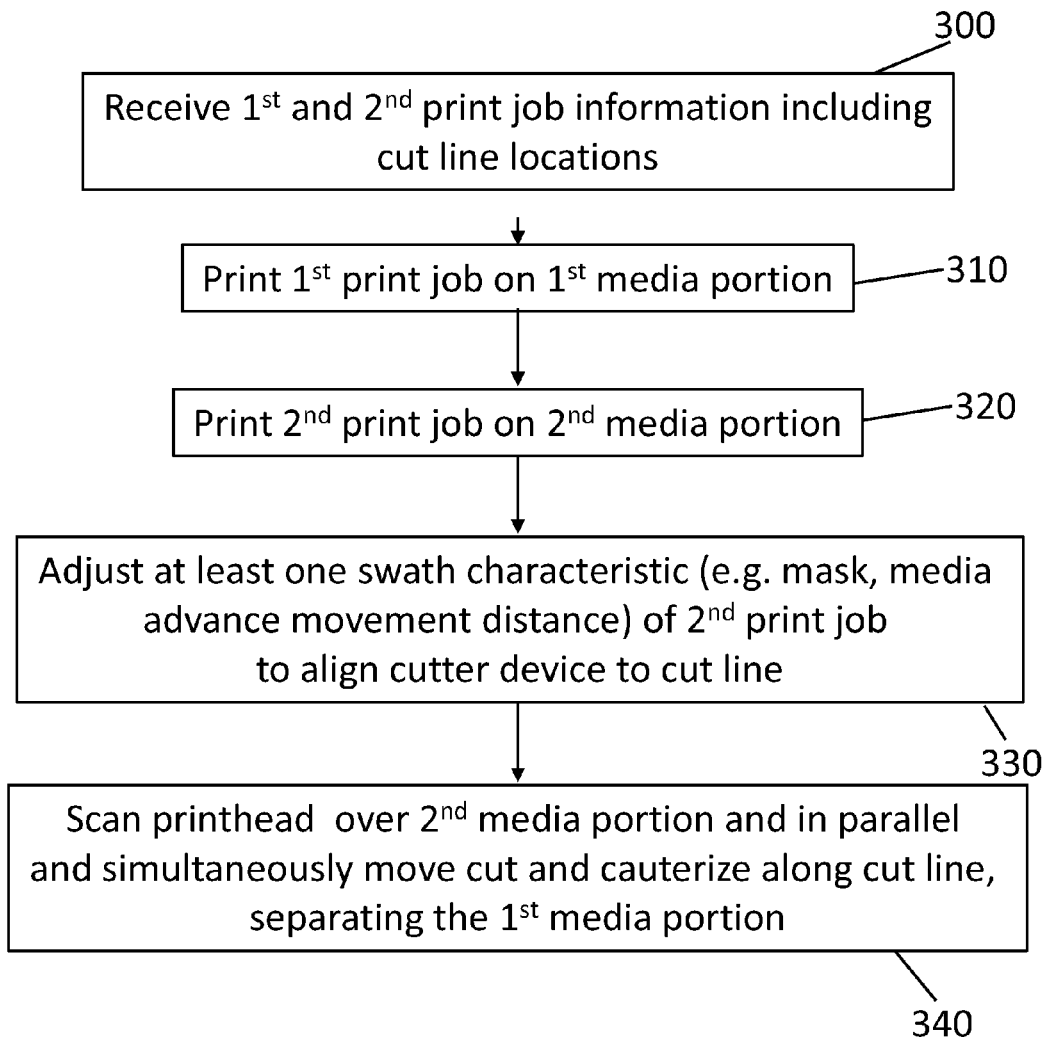
FIG. 9 shows a flow chart of another example of a method of printing.

FIG. 9 shows a flow chart of another example of a method of printing. In the example method, the control circuit 6 receives first and second print job information (block 300), for example through a wired or wireless connection or from a second storage device. In an example, at least one of the first and second print job information includes a cut line location 33 for separating the first media portion 4 from the second media portion 5. The example method includes printing the first print job on the first media portion 4 (block 310). This results in the first printed image 34A. The example method includes at least partially printing the second print job on the second media portion 5 (block 320), providing for the second, partially printed image 34B. The example method includes adjusting at least one swath characteristic of the second print job so that the cutter assembly 3 is aligned (block 330). For example, the swath characteristic may be at least one of a media advance movement distance d1 and an interleave mask characteristic. For example, the interleave mask characteristic may include a repositioning and a rearrangement of the interleave mask 35A1, 35B1, 35B2, 35C1, 35C2, 35D1. In an example, the cauterization device 24 is switched on before cutting. The example method may include scanning the printhead assembly 2 to print the adapted swath and in parallel move the cutter assembly 3 to cut and cauterize the respective borders of the media portions 4, 5 along the cut line 28 (block 340).

Figure 10:
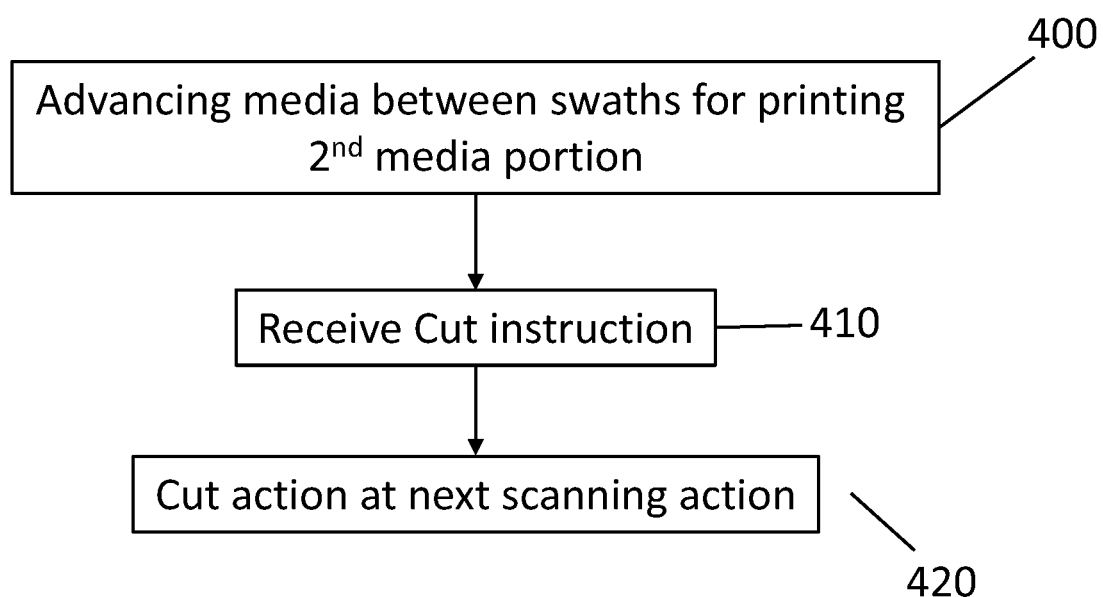
FIG. 10 shows a flow chart of another example of a method of printing.

FIG. 10 shows a flow chart of an example of a method of cutting media. In the example method, media is advanced between swaths 27A-D for printing the second media portion 5 (block 400). For example, the printer 1 receives an immediate cut instruction (block 410), for example through a user interface. For example, the first media portion 4 is separated from the second media portion 5 by executing a cut action during the next scanning action (block 420). The cut action was executed during the scanning action of the printhead assembly 2, so that no printing efficiency was lost in the process.

The above description is not intended to be exhaustive or to limit this disclosure to the examples disclosed. Other variations to the disclosed examples can be understood and effected by those skilled in the art from a study of the drawings, the disclosure, and the claims. The indefinite article "a" or "an" does not exclude a plurality, while a reference to a certain number of elements does not exclude the possibility of having more or less elements. A single unit may fulfil the functions of several items recited in the disclosure, and vice versa several items may fulfil the function of one unit. Multiple alternatives, equivalents, variations and combinations may be made without departing from the scope of this disclosure.

The invention claimed is:

1. A printer, comprising
   a printhead assembly,
   a cutter assembly arranged downstream of the printhead assembly, and
   a control circuit to:
   adjust a media advance movement distance for aligning a first media portion and a subsequent media portion with respect to the cutter assembly, in correspondence with a predetermined cut line location,
   adjust an interleave mask characteristic of a swath to match subsequent swaths when the media advance movement distance has been adjusted, and
   instruct the cutter assembly to separate the printed first media portion from the subsequent media portion during printing of the subsequent media portion.

2. The printer of claim 1, wherein the control circuit is configured to adapt a swath characteristic during the printing of the subsequent media portion for positioning the media portions with respect to a cut line location between the printed first media portion and the subsequent media portion, during printing of the subsequent media portion.

3. The printer of claim 1, wherein the control circuit is configured to instruct the cutter assembly to cut while scanning the print head assembly for printing the subsequent media portion.

4. The printer of claim 1, wherein the control circuit is configured to
   receive print job information that includes a cut line location with respect to a print image, and
   instruct the cutter assembly to separate the first media portion at said cut line location.

5. The primer of claim 1, wherein the cutter assembly is arranged to cut in two opposite directions, perpendicular to the media advance direction.

6. The printer of claim 1, wherein the cutter assembly comprises a cauterization device arranged to cauterize while cutting.

7. The printer of claim 1, wherein the cutter assembly comprises
   at least one cut edge,
   wheels,
   a carriage for carrying the at least one cut edge and wheels, and
   a guide structure for guiding the carriage over a cut line for cutting the media.

8. A method of printing, comprising
   printing a first portion of a media with a printer,
   adapting a media advance movement distance to align the media with a predetermined cut line location,
   adjusting an interleave mask characteristic of a swath to match one of a previous swath and a subsequent swath based on the adapting of the media advance movement distance,
   printing a second portion of the media with the same printer, and
   separating, the first portion from the second portion during printing of the second portion.

9. The method of claim 8, comprising separating the first portion from the second portion while executing a unidirectional or bi-directional scanning movement of a printhead for printing a swath of the second portion.

10. A non-transitory computer-readable storage medium storing instructions that, when executed by a processor, cause the processor to:
    instruct a printer to advance a media by a first distance;
    instruct the printer to advance the media a second distance different than the first distance to align the media with a cutter assembly;
    adapt an interleave mask based on the second distance; and
    instruct the cutter assembly to separate a first portion of the media from a second portion of the media while the printer is printing on the media.

11. The non-transitory computer-readable storage medium of claim 10, wherein the printer comprises the non-transitory computer-readable storage medium.

* * * * *